(12) United States Patent
Stern (10) Patent No.: US 10,818,951 B2
(45) Date of Patent: Oct. 27, 2020

(54) METHOD AND MOLTEN SALT ELECTROLYTIC CELL FOR IMPLEMENTING A HYDROGEN FUEL, SUSTAINABLE, CLOSED CLEAN ENERGY CYCLE ON A LARGE SCALE

(71) Applicant: Alvin Gabriel Stern, Newton, MA (US)

(72) Inventor: Alvin Gabriel Stern, Newton, MA (US)

( * ) Notice: Subject to any disclaimer, the term of this patent is extended or adjusted under 35 U.S.C. 154(b) by 206 days.

(21) Appl. No.: 15/932,871

(22) Filed: May 12, 2018

(65) Prior Publication Data

US 2019/0348698 A1 Nov. 14, 2019

(51) Int. Cl.
| | |
|---|---|
| *H01M 8/14* | (2006.01) |
| *H01M 8/04082* | (2016.01) |
| *H01M 8/0612* | (2016.01) |
| *H01M 8/04492* | (2016.01) |
| *H01M 8/04828* | (2016.01) |
| *C25B 1/04* | (2006.01) |
| *H01M 8/22* | (2006.01) |

(52) U.S. Cl.
CPC ............. *H01M 8/146* (2013.01); *C25B 1/04* (2013.01); *H01M 8/04216* (2013.01); *H01M 8/04492* (2013.01); *H01M 8/04835* (2013.01); *H01M 8/0631* (2013.01); *H01M 8/22* (2013.01); *H01M 2300/006* (2013.01)

(58) Field of Classification Search
CPC ............. C25B 1/04; H01M 2300/006; H01M 8/04216; H01M 8/04492; H01M 8/04835; H01M 8/0631; H01M 8/146; H01M 8/22
See application file for complete search history.

(56) References Cited

U.S. PATENT DOCUMENTS

| | | | |
|---|---|---|---|
| 2009/0202413 A1* | 8/2009 | Saxena | C01D 7/07 423/277 |
| 2013/0115139 A1* | 5/2013 | Stern | C01B 3/08 422/112 |

OTHER PUBLICATIONS

Stern, A.G., "Novel Method and Molten Salt Electrolytic . . . " Energy Sustainability in Built and Urban Environments, Springer Nature, Singapore, pp. 277-312, (2019).
(Continued)

*Primary Examiner* — Adam A Arciero (57) ABSTRACT

A hydrogen fuel, sustainable, closed clean energy cycle based on green chemistry is presented for large scale implementation using a cost effective electrolytic cell. A chemical reaction between salinated (sea) or desalinated (fresh) water ($H_2O$) and sodium (Na) metal produces hydrogen ($H_2$) fuel and sodium hydroxide (NaOH) byproduct. The NaOH is reprocessed in a solar powered electrolytic Na metal production plant that can result in excess chlorine ($Cl_2$) from sodium chloride (NaCl) in sea salt mixed with NaOH, used to effect freezing point lowering of seawater reactant for hydrogen generation at reduced temperatures. The method and molten salt electrolytic cell enable natural separation of NaCl from NaOH, thereby limiting excess $Cl_2$ production. The recovered NaCl is used to produce concentrated brine solution from seawater for hydrogen generation in cold climates, or becomes converted to sodium carbonate ($Na_2CO_3$) via the Solvay process for electrolytic production of Na metal without $Cl_2$ generation.

12 Claims, 6 Drawing Sheets

(56) References Cited

OTHER PUBLICATIONS

Stern, A.G., "Scalable, Self-Contained Sodium Metal . . . " Recent Improvements of Power Plants Management . . . Intech, Vienna, pp. 145-189, (2017).
Stern, A.G., "Design of an efficient, high purity . . . " International Journal of Hydrogen Energy, 40(32), pp. 9885-9906, (2015).
Stern, A.G., "A new sustainable hydrogen clean . . . " International Journal of Hydrogen Energy, 43(9), pp. 4244-4255, (2018).

* cited by examiner

METHOD AND MOLTEN SALT ELECTROLYTIC CELL FOR IMPLEMENTING A HYDROGEN FUEL, SUSTAINABLE, CLOSED CLEAN ENERGY CYCLE ON A LARGE SCALE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

There is a need in the modern world to effect a transition to clean renewable fuels from the present large scale use of carbon based fossil fuels in transportation applications and ground based energy generation. The reasons for implementing such a transition are manifold, including first and foremost, the need to prevent irreversible environmental damage caused by the unbridled proliferation of motor vehicles equipped with hydrocarbon fueled internal combustion engines (ICEs) on a planet where the human population is inexorably increasing toward the 10 billion mark. In 2015, the carbon dioxide ($CO_2$) mole fraction in the earth's atmosphere for the first time attained 0.04% (400 ppm) and has been climbing steadily from a level of 315 ppm measured in 1958, when monitoring at the Mauna Loa Observatory (MLO) in Hawaii began. The MLO measurements were confirmed at the Cape Grim Baseline Atmospheric Pollution Station (CGBAPS) in Tasmania. Once an atmospheric mole fraction of 0.5-2% (5,000-20,000 ppm) is exceeded, human life on earth might be jeopardized.

Hydrogen ($H_2$) which is stored in near limitless quantity in seawater is the only alternative fuel that is more abundant and environmentally cleaner with the potential of having a lower cost than nonrenewable carbon based fossil fuels, assuming that engineering challenges related to safe implementation and economical extraction of the hydrogen are overcome. The existing methods of storing hydrogen on board motor vehicles utilize cryogenic storage of liquid hydrogen ($H_{2(l)}$), storage of hydrogen ($H_{2(g)}$) gas at pressures as high as 70 MPa (10,153 psi) in cylinders made from composite material, and storage as a metal hydride ($MH_x$) in tanks filled with porous metal sponge or powder comprised of light group 1 and 2 metals and/or transition metal elements, namely, Titanium (Ti) or Nickel (Ni). Such direct hydrogen storage methods however, are impractical due to the high cost of suitable transition metals Ti and Ni, and moreover, because an infrastructure is needed to supply hydrogen directly in large volume to fill liquid or gas tanks or to saturate or replenish the metal sponge within the storage reservoir inside a motor vehicle, a procedure fraught with all of the well known safety risks associated with handling large volumes of elemental hydrogen. Furthermore, the existing industrial method of generating hydrogen ($H_{2(g)}$) gas using steam reforming of natural gas, the latter containing mostly methane ($CH_4$), produces significant quantities of carbon monoxide (CO) even after application of the shift reaction, the latter meant to transform the CO into carbon dioxide ($CO_2$). The presence of even minute quantities of CO on the parts per million (ppm) order of magnitude in $H_{2(g)}$ fuel, results in rapid poisoning of sensitive platinum (Pt) catalysts present in the latest generation of low operating temperature, proton exchange membrane (PEM) fuel cells. Catalysts based on a mixture of platinum and ruthenium (Pt—Ru) developed to overcome the sensitivity of pure Pt to carbon monoxide poisoning are not cost effective for large scale application in motor vehicles due to the dearth of ruthenium. Since hydrogen production by conventional steam reforming of methane generates significant quantities of CO and $CO_2$, it becomes difficult to justify using the approach to generate hydrogen ($H_2$) fuel for fuel cell electric vehicles (FCEVs) given that the purpose of advancing such technology is to eliminate carbon based fossil fuel emissions.

Fortunately, the element sodium (Na) positioned two rows below hydrogen in Group 1 of the periodic table of elements, is sufficiently electropositive to be capable of chemically releasing the $H_{2(g)}$ fuel stored in either ordinary salinated (sea) or desalinated (fresh) water ($H_2O$) over a wide temperature range by implementing the following chemical reaction:

$$2Na + 2H_2O \rightarrow H_2 + 2NaOH \qquad \text{Reaction 1:}$$

A controlled chemical reaction between sodium (Na) metal and water ($H_2O$) can be implemented in a scalable hydrogen generation apparatus where liquid water ($H_2O_{(l)}$) is made to react with solid sodium ($Na_{(s)}$) metal reactant to produce hydrogen ($H_{2(g)}$) gas and sodium hydroxide (NaOH) byproduct as disclosed in U.S. Pat. No. 8,951,312 issued to the applicant. The high purity hydrogen ($H_{2(g)}$) fuel produced on demand by the hydrogen generation apparatus can be used to safely power fuel cell electric vehicles (FCEVs) without contaminating the sensitive platinum (Pt) catalysts present in proton exchange membrane (PEM) fuel cells or any other types of catalysts in fuel cells, because the hydrogen is not derived from carbon based fossil fuels, and therefore does not contain even trace amounts of carbon monoxide or sulfur compounds. The seawater reactant can be concentrated to as much as 252.18 grams of sea salt solute per kilogram of seawater solution to provide a fusion temperature $T_{Eu}=-21.2°$ C. (215.95 K), that is equivalent to the eutectic temperature of a 23.18% by weight sodium chloride (NaCl) in NaCl—$H_2O$ solution. The concentrated sea salt in seawater solution allows the hydrogen generator to operate reliably over a wide ambient temperature range from $-21.2°$ C. (251.95 K) to 56.7° C. (329.85 K) prevailing in the conterminous 48 states of the U.S.A.

The scalable hydrogen generation apparatus implementing the controlled chemical reaction between sodium (Na) metal and water ($H_2O$) can be coupled with a fuel cell to produce a hydrogen fuel cell electric generator that can deliver electric power to continuously recharge a battery electric vehicle (BEV), thereby extending the range of the motor vehicle. The hydrogen fuel cell electric generator comprising the hydrogen generation apparatus can also provide for the comprehensive energy needs of single family homes and light commercial establishments.

In warm climates, desalinated (fresh) water ($H_2O$) reactant can be used in the hydrogen generation apparatus to produce $H_{2(g)}$ fuel and sodium hydroxide (NaOH). The sodium hydroxide (NaOH) byproduct can be reprocessed in a self-contained solar powered electrolytic sodium (Na)

metal production plant to recover the Na metal for reuse in generating $H_{2(g)}$ fuel according to the following reaction:

$$4Na^+ + 4OH^- \rightarrow 4Na + 2H_2O + O_2 \quad \text{Reaction 2:}$$

Using solar powered electrolysis to reprocess NaOH, enables elimination of carbon dioxide ($CO_2$) emissions. In contrast, the existing industrial method of generating hydrogen ($H_{2(g)}$) gas using steam reforming of natural gas, the latter containing mostly methane ($CH_4$), produces significant quantities of carbon dioxide ($CO_2$), a greenhouse gas. If concentrated sea salt in seawater solution is used for operation of the hydrogen generation apparatus in cold climates, then the self-contained solar powered electrolytic sodium (Na) metal production plant will implement electrolysis on a mixture of NaOH and sea salt, the latter consisting primarily of sodium chloride (NaCl) according to the following reactions:

$$4Na^+ + 4OH^- \rightarrow 4Na + 2H_2O + O_2 \quad \text{Reaction 2:}$$

$$2Na^+ + 2Cl^- \rightarrow 2Na + Cl_2 \quad \text{Reaction 3:}$$

When the byproducts of the hydrogen generating chemical reaction between concentrated seawater ($H_2O$) and sodium (Na) metal consisting primarily of NaOH and NaCl, the latter obtained from the seawater, are recovered and recycled using electrolysis, more Na metal will have been produced by the electrolysis than was originally available when the hydrogen generation apparatus was freshly fueled. Therefore, it becomes possible to passively increase the amount of sodium (Na) metal in the closed hydrogen fuel clean energy cycle. When implementing electrolysis on NaOH and NaCl on a large scale however, toxic chlorine ($Cl_2$) can be produced from the electrolysis of NaCl in greater quantity than can be sold to industry. The present invention describes a method for implementing a hydrogen fuel, sustainable, closed clean energy cycle on a large scale based entirely on green chemistry without excess $Cl_2$ production using a cost effective electrolytic cell for high purity sodium (Na) metal recovery.

The byproduct mixture of NaOH and NaCl recovered from the hydrogen generation apparatus during motor vehicle refueling is transported by truck, rail car or pipeline to self-contained solar powered electrolytic sodium (Na) metal production plants for recovery of Na metal. The electrolytic cells at the plant are charged with the aqueous mixture of $NaOH_{(aq)}$ and $NaCl_{(aq)}$. The plant management then decides if chlorine ($Cl_2$) production is needed. If the response is affirmative, then the electrolysis proceeds in a manner that results in the decomposition of the entire contents of the cell including both NaOH and NaCl, to yield $H_2O_{(g)}$, $O_{2(g)}$ and $Cl_{2(g)}$ at the anode and more Na metal at the cathode than had been previously used to fuel the hydrogen generation apparatus. The electrolysis of NaOH and NaCl can occur simultaneously or sequentially by using the difference in decomposition potentials between the NaOH and NaCl. The $Cl_{2(g)}$ is separated from the steam ($H_2O_{(g)}$) and oxygen ($O_{2(g)}$) effluent gases generated at the anode of the cell to be bottled and later sold to manufacturers including paper, polymer (plastic) and chemical industries. The sodium (Na) metal produced at the cathode of the cell is hermetically packaged for reuse in generating $H_{2(g)}$ fuel in the hydrogen generation apparatus units.

If however, $Cl_2$ production is not needed then electrolysis proceeds at a lowered electrolytic cell voltage, in a manner that results in selective decomposition of only NaOH according to Reaction 2, while NaCl is not decomposed by the cell. At the end of the electrolysis, the NaCl is recovered from the electrolytic cell. The plant management then decides if additional sodium (Na) metal from the NaCl is needed. If additional Na is not needed, then the NaCl is mixed with seawater to create concentrated brine solution for use as a reactant in the hydrogen generation apparatus units operating in cold climates. If however, additional Na from the NaCl is required to expand capacity in the hydrogen fuel clean energy cycle then the NaCl is sent for conversion to sodium carbonate ($Na_2CO_3$) in a Solvay plant that implements the following net chemical reaction: $2NaCl + CaCO_3 \rightarrow Na_2CO_3 + CaCl_2$. The Solvay process for the manufacture of sodium carbonate ($Na_2CO_3$) has existed since the $19^{th}$ century to economically process sodium chloride (NaCl) and calcium carbonate ($CaCO_3$) reactants, the latter also known as limestone into $Na_2CO_3$ and calcium chloride ($CaCl_2$) products. The $CaCO_3$ reactant is abundantly available and mined routinely while the $CaCl_2$ byproduct of the Solvay process is not toxic to humans or deleterious to the environment and can be sold as road salt for deicing motorways in cold climates. The $Na_2CO_3$ produced by the Solvay process from NaCl recovered from the hydrogen generation apparatus can be supplied to the electrolytic cells of the self-contained solar powered electrolytic sodium (Na) metal production plants to recover the Na metal according to the following decomposition reaction:

$$4Na^+ + 2CO_3^{-2} \rightarrow 4Na + 2C + 3O_2 \quad \text{Reaction 4:}$$

The electrolysis of $Na_2CO_3$ that yields sodium (Na) metal, carbon (C) and oxygen ($O_2$) products can be achieved by operating the electrolytic cell at an elevated voltage to suppress the evolution of carbon monoxide (CO) and/or carbon dioxide ($CO_2$) at the anode, and instead deposit pure carbon (C) and sodium (Na) metal at the cathode. The carbon deposits at the cathode of the electrolytic cell can be collected and removed. The $Na_2CO_3$ is sourced economically from mining in addition to Solvay production and therefore, constitutes a cost effective means of producing large quantities of sodium (Na) metal by electrolysis while avoiding excess $Cl_2$ accompanying the production of sodium (Na) metal from electrolysis of NaCl.

The hydrogen fuel clean energy cycle also supports sodium hydride (NaH) manufacture by means of a separate plant for the coproduction of elemental hydrogen ($H_2$) in proximity to the self-contained solar powered electrolytic sodium (Na) metal production plant. The $H_2$ required for NaH production can be obtained from clean sources using solar powered electrolysis of water ($H_2O$) with photovoltaic (PV) panels, photocatalytic or photoelectrochemical (PEC) methods, or from biohydrogen generation using chemical, thermochemical, biological, biochemical and biophotolytical methods. The hydrogen generation apparatus can be fueled either with Na metal or with NaH, the latter for applications where enhanced $H_2$ generating capacity is necessary.

The complete hydrogen fuel clean energy cycle enables a safe, reliable and cost effective means of scaling up sodium (Na) metal production by using either $Na_2CO_3$ or NaCl for the manufacture of Na metal in the copious quantities needed for fueling hydrogen generation systems. The electrolysis of $Na_2CO_3$ provides a practical means of avoiding excess $Cl_2$ production that might accompany the large scale electrolysis of NaCl. The hydrogen fuel, sustainable, closed clean energy cycle can be initiated using electrolysis of $Na_2CO_3$ until sufficient Na metal exists to allow only for reprocessing of NaOH to recover the Na metal for reuse in generating $H_{2(g)}$ fuel, thereby avoiding $Cl_2$ production altogether. Only if $Cl_2$ is required by manufacturing industries, does electrolysis of NaCl have to be performed. Otherwise, the NaCl can be converted $Na_2CO_3$ or mixed with seawater to create concentrated brine solution for use as a reactant in the hydrogen generation apparatus units operating in cold climates.

A cost effective electrolytic cell supports the implementation of the hydrogen fuel, sustainable, closed clean energy cycle on a large scale, by being capable of performing electrolysis on three types of molten salts individually including NaOH, NaCl, $Na_2CO_3$ or on a mixture of NaOH and NaCl, including selective electrolysis between NaOH and NaCl. The electrolytic cell is designed to perform electrolysis at a temperature range between 1223.15 K (950° C.) to 1323.15 K (1050° C.) that is significantly higher than the operating temperatures of Castner or Downs type electrolytic cells where sodium (Na) metal is produced in a liquid state during electrolysis. There exist three principal reasons for operating the electrolytic cell at such elevated temperatures. First, the high temperature operation enables the fused salt(s) in the crucible to become completely anhydrous by evaporating any residual water ($H_2O$) content from the salt(s) including the water produced at the cell anode. Second, the high temperature of the electrolytic cell is well above the boiling point temperature of sodium (Na) metal given as $T_b$=1154.5 K. As a result, the sodium (Na) metal is produced in a vapor state at the cathode and does not dissolve into the fused or molten salt(s), thereby providing a direct means of separating and purifying the Na metal where otherwise, the Na produced at the cathode might dissolve into the fused salt(s) and react with steam ($H_2O_{(g)}$) and oxygen ($O_{2(g)}$) produced at the anode to lower the overall efficiency and production yield of Na metal by the electrolytic cell. Third, the high temperature operation of the electrolytic cell above the boiling point of sodium (Na) metal enables selective electrolysis between NaOH and NaCl. Setting the electrolytic cell voltage to $V_{CELL}$=1.78 V is sufficient to electrolyze the fused $NaOH_{(l)}$ at temperatures ranging between 1223.15 K (950° C.) to 1323.15 K (1050° C.) while not electrolyzing the $NaCl_{(l)}$. Once all of the fused $NaOH_{(l)}$ has been decomposed, the electrolytic cell voltage can be increased to $V_{CELL}$=3.19 V to commence the electrolysis of fused $NaCl_{(l)}$. The large difference between the potentials needed to electrolyze fused $NaOH_{(l)}$ and $NaCl_{(l)}$ at elevated temperatures above the boiling point of sodium (Na) metal, favors high temperature operation of the electrolytic cell as compared with lower temperatures.

Although other methods exist for generating hydrogen ($H_{2(g)}$) fuel for transportation applications and ground based energy generation, these methods do not solve the problems of safe storage or cost effective $H_2$ generation on a large scale, in a manner that is environmentally clean and does not utilize carbon based fossil fuels. By contrast, the hydrogen fuel, sustainable, closed clean energy cycle of the present invention effectively stores the vast radiant energy emission of the sun produced by hydrogen fusion, in the form of solid sodium (Na) metal. The solid sodium (Na) metal can be stored almost indefinitely in hermetically sealed packaging that can be opened and loaded into a hydrogen generation apparatus to safely produce $H_{2(g)}$ fuel on demand, at the time and point of use via the controlled chemical reaction with either ordinary salinated (sea) or desalinated (fresh) water ($H_2O$). The sodium hydroxide (NaOH) byproduct mixed with NaCl from seawater can be reprocessed using a cost effective electrolytic cell capable of implementing selective electrolysis between the NaOH and NaCl at high temperature above the boiling point of Na metal, to recover high purity Na metal in an environmentally clean manner without excess $Cl_2$ production, for reuse in generating $H_{2(g)}$ fuel. The cost effective electrolytic cell supports the implementation of the hydrogen fuel, sustainable, closed clean energy cycle on a large scale.

As illustrated in U.S. Pat. No. 452,030, the method proposed for electrolyzing sodium hydroxide (NaOH) utilizes a low temperature of operation of approximately 310° C. to 330° C. that is no more than 20° C. above the melting point of the sodium hydroxide (NaOH). As a result, the sodium (Na) metal is produced in a liquid state above the denser NaOH. The low temperature of operation of the electrolytic cell entails that NaOH is not anhydrous and water ($H_2O$) continues to remain in the NaOH. The water ($H_2O$) in the NaOH can react with the Na metal produced at the cathode to lower the Na metal production yield. The described invention for electrolyzing sodium hydroxide (NaOH) and potassium hydroxide (KOH), does not propose a method for implementing a hydrogen fuel, sustainable, closed clean energy cycle using solar powered electrolysis by means of a cost effective electrolytic cell capable of performing electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

As illustrated in U.S. Pat. No. 4,276,145, the method proposed for improving the operating efficiency of Castner type electrolytic cells utilizes a system for transporting the anolyte with dissolved water ($H_2O$) to an anolyte electrolytic dehydrator which is an electrolysis cell operated at a voltage sufficient to decompose the water ($H_2O$) into hydrogen and oxygen but is not sufficient to decompose the alkali hydroxide. The hydrogen and oxygen subsequently react electrochemically in a fuel cell to generate electrical energy thereby improving energy efficiency by reducing sodium (Na)-water ($H_2O$) reactions in the Castner cell and by recovering a portion of the energy used to remove the water ($H_2O$). The described invention for electrolyzing sodium hydroxide (NaOH) and potassium hydroxide (KOH), does not propose a method for implementing a hydrogen fuel, sustainable, closed clean energy cycle using solar powered electrolysis by means of a cost effective electrolytic cell capable of performing electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

As illustrated in U.S. Pat. No. 1,501,756, the method proposed for electrolysis of alkali halides and specifically sodium chloride (NaCl) allows the recovery of dry chlorine ($Cl_2$) gas produced at the anode of the electrolysis cell as well as pure sodium (Na) metal which is produced at the cathode of the cell in a liquid state. The electrolysis cell consists of three distinct chambers where dry chlorine ($Cl_2$) gas is collected in the central anode chamber and pure liquid sodium (Na) metal is collected in the annular cathode chamber. The sodium chloride (NaCl) can be loaded into the third chamber which is distinct from the anode and cathode chambers, allowing moisture that may be present in the solid sodium chloride (NaCl) to be driven away from the fused bath before it can react with any of the contents of the anode and cathode chambers. The described invention for electrolyzing alkali halides including sodium chloride (NaCl), does not propose a method for implementing a hydrogen fuel, sustainable, closed clean energy cycle using solar powered electrolysis by means of a cost effective electrolytic cell capable of performing electrolysis on three types of molten salts individually including NaOH, NaCl, Na$_2$CO$_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

As illustrated in U.S. Pat. No. 1,839,756, the method proposed for electrolysis of akali halides and specifically the production of sodium (Na) metal from a fused bath of sodium chloride (NaCl) at high current efficiencies well above 50%, uses high temperatures of operation above the volatilization temperature of the sodium (Na) metal. The electrolysis cell is constructed in a manner that can withstand the severe conditions of service without serious deterioration for long periods of continuous operation. Operation of the electrolytic cell is controlled by varying the depth of immersion of the cathode and consequently the area effective for electrolysis. By restricting the cathode area and thereby maintaining a high current density at the cathode surface, sufficient heat is developed to raise the fused salt temperature at the cathode surface between 900° C. to 950° C. that the sodium (Na) metal is vaporized immediately as it is formed. The described invention for electrolyzing alkali halides including sodium chloride (NaCl), does not propose a method for implementing a hydrogen fuel, sustainable, closed clean energy cycle using solar powered electrolysis by means of a cost effective electrolytic cell capable of performing electrolysis on three types of molten salts individually including NaOH, NaCl, Na$_2$CO$_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

As illustrated in European Pat. App. No. 83305984.3, the method proposed for electrolysis of sodium carbonate for producing metallic sodium uses molten sodium carbonate placed in an electrolytic cell containing a liquid metal cathode. The sodium ion is reduced into the liquid metal cathode as metallic sodium and the carbonate ion reacts at the anode to form a gas. The metallic sodium can be recovered from the liquid metal cathode by reaction with steam to produce sodium hydroxide (NaOH) that is free of sodium chloride (NaCl) contaminant and has a higher concentration than what can be produced from electrolysis of aqueous sodium chloride (NaCl$_{(aq)}$) solutions. The described invention for electrolyzing sodium carbonate (Na$_2$CO$_3$), does not propose a method for implementing a hydrogen fuel, sustainable, closed clean energy cycle using solar powered electrolysis by means of a cost effective electrolytic cell capable of performing electrolysis on three types of molten salts individually including NaOH, NaCl, Na$_2$CO$_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

Note that the above methods for electrolysis of alkali hydroxides, alkali halides and alkali carbonates do not envision, nor describe a method for implementing a hydrogen fuel, sustainable, closed clean energy cycle using solar powered electrolysis by means of a cost effective electrolytic cell capable of performing electrolysis on three types of molten salts individually including NaOH, NaCl, Na$_2$CO$_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

BRIEF SUMMARY OF THE INVENTION

The challenges associated with supplanting carbon based fossil fuels in motor vehicle transport applications and more broadly for ground based energy generation can be overcome with the method and apparatus of the present invention. The hydrogen fuel, sustainable, closed clean energy cycle method of the present invention can be implemented on a large scale with zero emissions of carbon monoxide (CO) and carbon dioxide (CO$_2$) using a cost effective electrolytic cell capable of performing electrolysis on three types of molten salts individually including NaOH, NaCl, Na$_2$CO$_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

In the preferred embodiment, the hydrogen fuel, sustainable, closed clean energy cycle method utilizes a hydrogen generation apparatus that implements a controlled chemical reaction between either ordinary salinated (sea) or desalinated (fresh) water (H$_2$O) and sodium (Na) metal over a wide temperature range according to the following chemical reaction:

$$2Na+2H_2O \rightarrow H_2+2NaOH \quad \text{Reaction 1:}$$

In warm climates, desalinated (fresh) water (H$_2$O) reactant can be used in the hydrogen generation apparatus to produce H$_{2(g)}$ fuel and sodium hydroxide (NaOH). The sodium hydroxide (NaOH) byproduct can be reprocessed in a self-contained solar powered electrolytic sodium (Na) metal production plant to recover the Na metal for reuse in generating H$_{2(g)}$ fuel according to the following reaction:

$$4Na^+ + 4OH^- \rightarrow 4Na + 2H_2O + O_2 \quad \text{Reaction 2:}$$

Using solar powered electrolysis to reprocess NaOH, enables elimination of carbon dioxide (CO$_2$) emissions. If concentrated sea salt in seawater solution is used for operation of the hydrogen generation apparatus in cold climates, then the self-contained solar powered electrolytic sodium (Na) metal production plant will implement electrolysis on a mixture of NaOH and sea salt, the latter consisting primarily of sodium chloride (NaCl) according to the following reactions:

$$4Na^+ + 4OH^- \rightarrow 4Na + 2H_2O + O_2 \quad \text{Reaction 2:}$$

$$2Na^+ + 2Cl^- \rightarrow 2Na + Cl_2 \quad \text{Reaction 3:}$$

When the byproducts of the hydrogen generating chemical reaction between concentrated seawater (H$_2$O) and sodium (Na) metal consisting primarily of a mixture of NaOH and NaCl, the latter obtained from the seawater, are recovered and recycled using electrolysis, more Na metal will have been produced by the electrolysis than was originally available when hydrogen generation apparatus was freshly fueled. Therefore, it becomes possible to passively increase the amount of sodium (Na) metal in the closed hydrogen fuel clean energy cycle. When implementing electrolysis on a mixture of NaOH and NaCl on a large scale however, toxic chlorine (Cl$_2$) can be produced from the electrolysis of NaCl in greater quantity than can be sold to industry. The byproduct mixture of NaOH and NaCl recovered from the hydrogen generation apparatus units during motor vehicle refueling is transported by truck, rail car or pipeline to self-contained solar powered electrolytic sodium (Na) metal production plants for recovery of Na metal. The cost effective electrolytic cells at the plant are charged with the aqueous mixture of $NaOH_{(aq)}$ and $NaCl_{(aq)}$. The plant management then decides if chlorine ($Cl_2$) production is needed. If the response is affirmative, then the electrolytic cell voltage is set to $V_{CELL}$=3.19 V that results in the decomposition of the entire contents of the cell including both fused $NaOH_{(l)}$ and $NaCl_{(l)}$, at a cell operating temperature above the boiling point of sodium (Na) metal, to yield $H_2O_{(g)}$, $O_{2(g)}$ and $Cl_{2(g)}$ at the anode and more Na metal at the cathode than had been previously used to fuel the hydrogen generation apparatus. The electrolysis of fused $NaOH_{(l)}$ and $NaCl_{(l)}$ can occur simultaneously or sequentially by using the difference in decomposition potentials between the NaOH and NaCl. The $Cl_{2(g)}$ is separated from the steam ($H_2O_{(g)}$) and oxygen ($O_{2(g)}$) effluent gases generated at the anode of the cell to be bottled and later sold to manufacturers including paper, polymer (plastic) and chemical industries. The sodium (Na) metal produced at the cathode of the cell is hermetically packaged for reuse in generating $H_{2(g)}$ fuel in the hydrogen generation apparatus units. If however, $Cl_2$ production is not needed then the electrolytic cell voltage is set to $V_{CELL}$=1.78 V that results in the selective decomposition of only fused $NaOH_{(l)}$ while $NaCl_{(l)}$ is not decomposed by the cell. At the end of the electrolysis, the NaCl is recovered from the electrolytic cell. The plant management then decides if additional sodium (Na) metal from the NaCl is needed. If additional Na is not needed, then the NaCl is mixed with seawater to create concentrated brine solution for use as a reactant in the hydrogen generation apparatus units operating in cold climates. If additional Na from the NaCl is required to expand capacity in the hydrogen fuel clean energy cycle then the NaCl is sent for conversion to sodium carbonate ($Na_2CO_3$) in a Solvay plant. The $Na_2CO_3$ produced by the Solvay process from NaCl recovered from the hydrogen generation apparatus can be supplied to the electrolytic cells of the self-contained solar powered electrolytic sodium (Na) metal production plants to recover the Na metal according to the following decomposition Reaction 4:

$4Na^+ + 2CO_3^{-2} \rightarrow 4Na + 2C + 3O_2$     Reaction 4:

$4Na^+ + 2CO_3^{-2} \rightarrow 4Na + 2CO + 2O_2$     Reaction 5:

$4Na^+ + 2CO_3^{-2} \rightarrow 4Na + 2CO_2 + O_2$     Reaction 6:

The electrolysis of fused $Na_2CO_{3(l)}$ that yields sodium (Na) metal, carbon (C) and oxygen ($O_2$) products according to Reaction 4, can be achieved by setting the electrolytic cell voltage to $V_{CELL}$≥3.68 V to suppress the evolution of carbon monoxide (CO) and/or carbon dioxide ($CO_2$) at the anode shown in Reactions 5 and 6, respectively, and instead deposit pure carbon (C) and sodium (Na) metal at the cathode. The carbon deposits at the cathode of the electrolytic cell can be collected and removed. The $Na_2CO_3$ is sourced economically from mining in addition to Solvay production and therefore, constitutes a cost effective means of producing large quantities of sodium (Na) metal by electrolysis while avoiding excess $Cl_2$ accompanying the production of sodium (Na) metal from electrolysis of NaCl.

The hydrogen fuel clean energy cycle supports sodium hydride (NaH) manufacture by means of a separate plant for the coproduction of elemental hydrogen ($H_2$) in proximity to the self-contained solar powered electrolytic sodium (Na) metal production plant. The $H_2$ required for NaH production can be obtained from clean sources using solar powered electrolysis of water ($H_2O$) with photovoltaic (PV) panels, photocatalytic or photoelectrochemical (PEC) methods, or from biohydrogen generation using chemical, thermochemical, biological, biochemical and biophotolytical methods. The hydrogen generation apparatus can be fueled either with Na metal or with NaH, the latter for applications where enhanced $H_2$ generating capacity is necessary.

The complete hydrogen fuel clean energy cycle enables a safe, reliable and cost effective means of scaling up sodium (Na) metal production by using either $Na_2CO_3$ or NaCl for the manufacture of Na metal in the copious quantities needed for fueling hydrogen generation systems. The electrolysis of $Na_2CO_3$ provides a practical means of avoiding excess $Cl_2$ production that might accompany the large scale electrolysis of NaCl. The hydrogen fuel, sustainable, closed clean energy cycle can be initiated using electrolysis of $Na_2CO_3$ until sufficient Na metal exists to allow only for reprocessing of NaOH to recover the Na metal for reuse in generating $H_{2(g)}$ fuel, thereby avoiding $Cl_2$ production altogether. Only if $Cl_2$ is required by manufacturing industries, does electrolysis of NaCl have to be performed. Otherwise, the NaCl can be converted $Na_2CO_3$ or mixed with seawater to create concentrated brine solution for use as a reactant in the hydrogen generation apparatus units operating in cold climates.

A cost effective electrolytic cell supports the implementation of the hydrogen fuel, sustainable, closed clean energy cycle on a large scale, by being capable of performing electrolysis on three types of molten salts individually including NaOH, NaCl, $Na_2CO_3$ or on a mixture of NaOH and NaCl, including selective electrolysis between NaOH and NaCl. The electrolytic cell is designed to perform electrolysis at a temperature range between 1223.15 K (950° C.) to 1323.15 K (1050° C.) that is significantly higher than the operating temperatures of Castner or Downs type electrolytic cells where sodium (Na) metal is produced in a liquid state during electrolysis. There exist three principal reasons for operating the electrolytic cell at such elevated temperatures. First, the high temperature operation enables the fused salt(s) in the crucible to become completely anhydrous by evaporating any residual water ($H_2O$) content from the salt(s) including the water produced at the cell anode. Second, the high temperature of the electrolytic cell is well above the boiling point temperature of sodium (Na) metal given as $T_b$=1154.5 K. As a result, the sodium (Na) metal is produced in a vapor state at the cathode and does not dissolve into the fused or molten salt(s), thereby providing a direct means of separating and purifying the Na metal where otherwise, the Na produced at the cathode might dissolve into the fused salt(s) and react with steam ($H_2O_{(g)}$) and oxygen ($O_{2(g)}$) produced at the anode to lower the overall efficiency and production yield of Na metal by the electrolytic cell. Third, the high temperature operation of the electrolytic cell above the boiling point of sodium (Na) metal enables selective electrolysis between NaOH and NaCl. Setting the electrolytic cell voltage to $V_{CELL}$=1.78 V is sufficient to electrolyze the fused $NaOH_{(l)}$ at temperatures ranging between 1223.15 K (950° C.) to 1323.15 K (1050° C.) while not electrolyzing the $NaCl_{(l)}$. Once all of the fused $NaOH_{(l)}$ has been decomposed, the electrolytic cell voltage can be increased to $V_{CELL}$=3.19 V to commence the electrolysis of fused $NaCl_{(l)}$. The large difference between the potentials needed to electrolyze fused $NaOH_{(l)}$ and $NaCl_{(l)}$ at elevated temperatures above the boiling point of sodium (Na) metal, favors high temperature operation of the electrolytic cell as compared with lower temperatures.

In summary, the advantages offered by the hydrogen fuel, sustainable, closed clean energy cycle method include the possibility of implementation on a large scale, supported by the cost effective electrolytic cell capable of performing electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal. The hydrogen fuel, sustainable, closed clean energy cycle method of the present invention when implemented on a large scale, will enable supplanting of carbon based fossil fuels in ground based energy generation and thereby eliminate a major source of environmental pollution and carbon dioxide ($CO_2$) emission into the earth's atmosphere.

BRIEF DESCRIPTION OF THE SEVERAL VIEWS OF THE DRAWING

These and other features of the subject of the invention will be better understood with connection with the Detailed Description of the Invention in conjunction with the Drawings, of which.

$4Na^+ + 4OH^- \rightarrow 4Na + 2H_2O + O_2$      Reaction 2.

$2Na^+ + 2Cl^- \rightarrow 2Na + Cl_2$      Reaction 3.

$4Na^+ + 2CO_3^{-2} \rightarrow 4Na + 2C + 3O_2$      Reaction 4.

$4Na^+ + 2CO_3^{-2} \rightarrow 4Na + 2CO + 2O_2$      Reaction 5.

$4Na^+ + 2CO_3^{-2} \rightarrow 4Na + 2CO_2 + O_2$      Reaction 6.

DETAILED DESCRIPTION OF THE INVENTION

Figure 1:
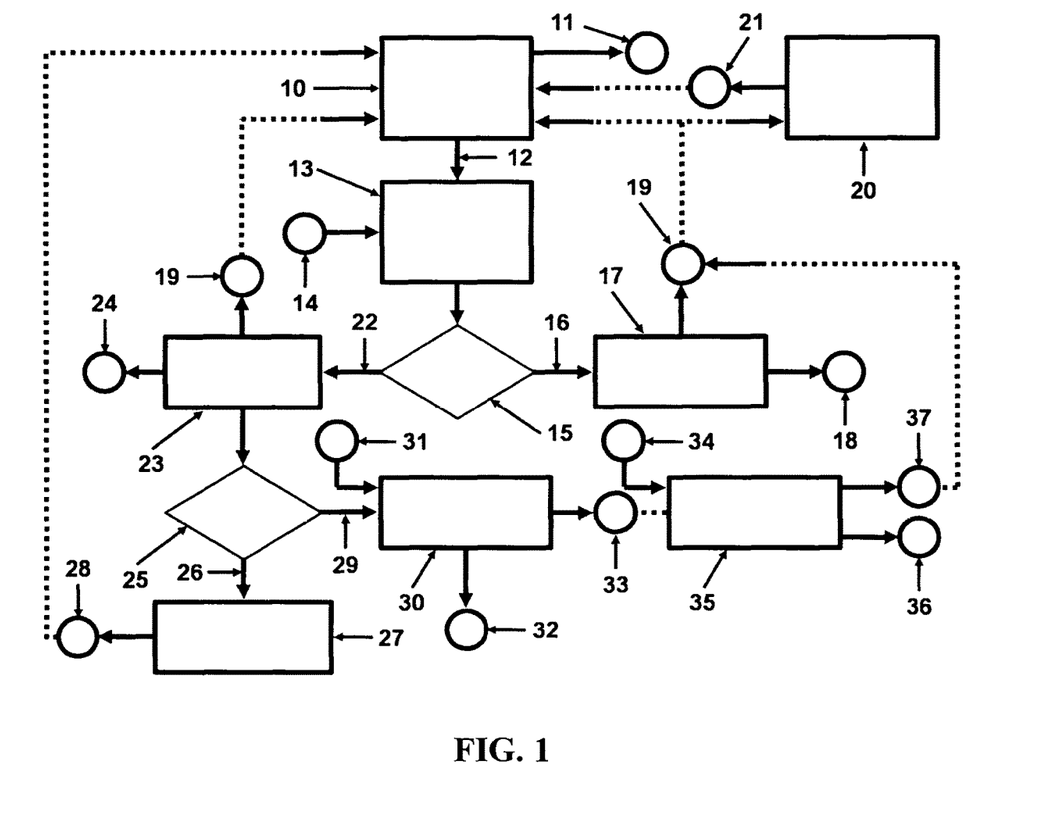
FIG. 1 illustrates the complete hydrogen fuel, sustainable, closed clean energy cycle method based entirely on green chemistry.

Referring to FIG. 1, a depiction is shown of the hydrogen fuel, sustainable, closed clean energy cycle meant to be implemented on a large scale using the cost effective electrolytic cell capable of performing electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal. The hydrogen fuel, sustainable, closed clean energy cycle method of the present invention, in a preferred embodiment consists of a hydrogen generation apparatus 10, that implements the controlled chemical reaction between either ordinary salinated (sea) or desalinated (fresh) water ($H_2O$) and sodium (Na) metal reactants over a wide temperature range to produce high purity hydrogen ($H_2$) fuel 11, according to following chemical reaction:

$2Na + 2H_2O \rightarrow H_2 + 2NaOH$      Reaction 1:

In warm climates, desalinated (fresh) water ($H_2O$) reactant can be used in the hydrogen generation apparatus 10, to produce $H_{2(g)}$ fuel 11, and sodium hydroxide (NaOH). The sodium hydroxide (NaOH) byproduct is recovered and transported 12, for reprocessing in a self-contained solar powered electrolytic sodium (Na) metal production plant 13, to recover the Na metal for reuse in generating $H_{2(g)}$ fuel 11, according to the following reaction:

$4Na^+ + 4OH^- \rightarrow 4Na + 2H_2O + O_2$      Reaction 2:

Using electric power 14, generated from an array of photovoltaic panels for electrolysis to reprocess NaOH according to Reaction 2, enables elimination of carbon dioxide ($CO_2$) emissions. If concentrated sea salt in seawater solution is used for operation of the hydrogen generation apparatus 10, in cold climates, then the self-contained solar powered electrolytic sodium (Na) metal production plant 13, will implement electrolysis on a mixture of NaOH and sea salt, the latter consisting primarily of sodium chloride (NaCl) according to the following reactions:

$4Na^+ + 4OH^- \rightarrow 4Na + 2H_2O + O_2$      Reaction 2:

$2Na^+ + 2Cl^- \rightarrow 2Na + Cl_2$      Reaction 3:

The byproduct mixture of NaOH and NaCl recovered from the hydrogen generation apparatus 10 units during motor vehicle refueling is transported 12, by truck, rail car or pipeline to self-contained solar powered electrolytic sodium (Na) metal production plants 13, for recovery of Na metal. The cost effective electrolytic cells at the plant are charged with the aqueous mixture of $NaOH_{(aq)}$ and $NaCl_{(aq)}$. The plant management then decides whether chlorine ($Cl_2$) production is needed 15. If the response is affirmative 16, then the electrolytic cell voltage is set to $V_{CELL}$=3.19 V that results in the decomposition of the entire contents of the cell including both fused $NaOH_{(l)}$ and $NaCl_{(l)}$ 17, at a cell operating temperature above the boiling point of sodium (Na) metal, to yield $H_2O_{(g)}$, $O_{2(g)}$ and $Cl_{2(g)}$ 18, at the anode and more Na metal 19, at the cathode than had been previously used to fuel the hydrogen generation apparatus 10. The electrolysis of fused $NaOH_{(l)}$ and $NaCl_{(l)}$ 17, can occur simultaneously or sequentially by using the difference in decomposition potentials between the NaOH and NaCl. The $Cl_{2(g)}$ is separated from the steam ($H_2O_{(g)}$) and oxygen ($O_{2(g)}$) 18, effluent gases generated at the anode of the cell to be bottled and later sold to manufacturers including paper, polymer (plastic) and chemical industries. The sodium (Na) metal 19, produced at the cathode of the cell is hermetically packaged for reuse in the hydrogen generation apparatus 10 units to produce $H_{2(g)}$ fuel 11. Alternatively, the sodium (Na)

metal 19, produced at the cathode of the cell can be sent to a solar or biohydrogen plant 20, to produce sodium hydride (NaH) 21, that can also be used in the hydrogen generation apparatus 10 units to produce $H_{2(g)}$ fuel 11. If however, the plant management decides that $Cl_2$ production is not needed 22, then the electrolytic cell voltage is set to $V_{CELL}$=1.78 V that results in the selective decomposition of only the fused $NaOH_{(l)}$ 23, producing steam $(H_2O_{(g)})$ and oxygen $(O_{2(g)})$ 24, at the anode while $NaCl_{(l)}$ is not decomposed by the cell. The sodium (Na) metal 19, produced at the cathode of the cell is hermetically packaged for reuse in the hydrogen generation apparatus 10 units to produce $H_{2(g)}$ fuel 11. At the end of the electrolysis, the NaCl is recovered from the electrolytic cell. The plant management then decides if additional sodium (Na) metal from the NaCl is needed 25. If the plant management decides that additional Na is not needed 26, then the NaCl is mixed with seawater 27, to create concentrated brine solution 28, for use as a reactant in the hydrogen generation apparatus 10 units operating in cold climates. If the plant management decides that additional Na from the NaCl is required 29, to expand capacity in the hydrogen fuel clean energy cycle then the NaCl is sent to a Solvay plant 30, that uses calcium carbonate $(CaCO_3)$ 31, reactant to produce calcium chloride $(CaCl_2)$ 32, byproduct and sodium carbonate $(Na_2CO_3)$ 33, according to the net reaction: $2NaCl+CaCO_3 \rightarrow Na_2CO_3+CaCl_2$. The $Na_2CO_3$ 34, is sourced economically from mining in addition to Solvay production and therefore, constitutes a cost effective means of producing large quantities of sodium (Na) metal by $Na_2CO_3$ electrolysis 35, while avoiding excess $Cl_2$ accompanying the production of sodium (Na) metal from electrolysis of NaCl. The sodium carbonate $(Na_2CO_3)$ is electrolyzed 35, at a cell operating temperature above the boiling point of sodium (Na) metal, to yield oxygen $(O_{2(g)})$ 36, at the anode, and carbon (C) and sodium (Na) metal 37, at the cathode according to the following reaction:

$$4Na^+ + 2CO_3^{-2} \rightarrow 4Na + 2C + 3O_2 \qquad \text{Reaction 4:}$$

The sodium (Na) metal 19, produced at the cathode of the cell is hermetically packaged for reuse in the hydrogen generation apparatus 10 units to produce $H_{2(g)}$ fuel 11.

Figure 2:
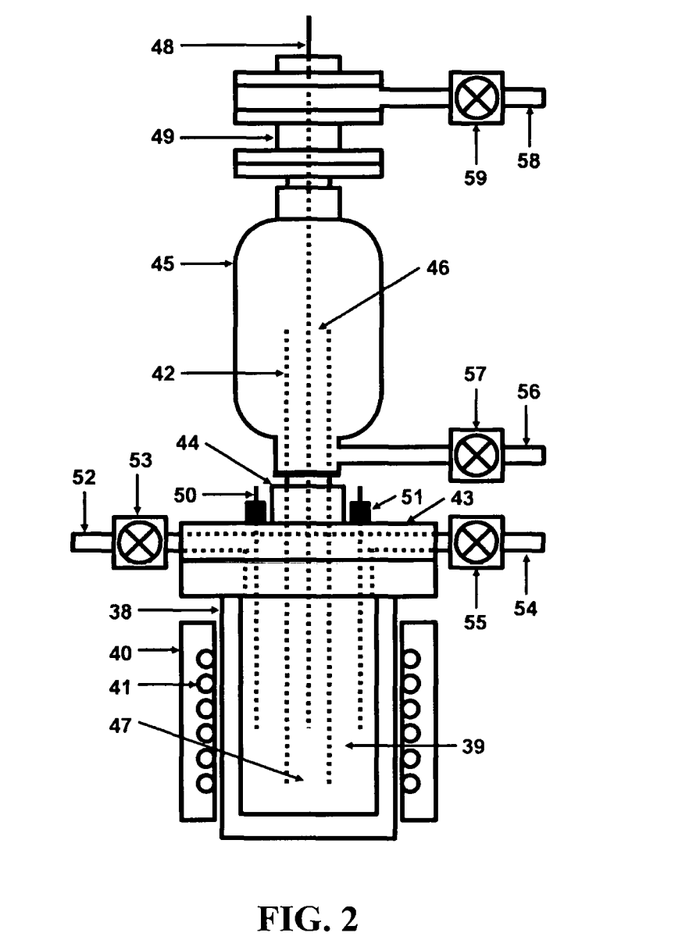
FIG. 2 illustrates the cost effective electrolytic cell that supports implementation of the hydrogen fuel clean energy cycle on a large scale by having the capability to perform electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

Referring to FIG. 2, a depiction of the cost effective electrolytic cell designed to perform electrolysis at a temperature range between 1223.15 K (950° C.) to 1323.15 K (1050° C.) is shown consisting of a crucible 38, constructed from a refractory metal such as iron (Fe), nickel (Ni) or the nickel alloy C-276, resistant to molten salt corrosion at elevated temperatures. The crucible 38, holds a molten or fused salt charge 39, consisting of either pure sodium hydroxide (NaOH) or a mixture of sodium hydroxide (NaOH) and sea salt, the latter comprising primarily sodium chloride (NaCl). In addition, the crucible 38, can hold a charge 39, of pure sodium carbonate $(Na_2CO_3)$. The crucible 38, is heated by a radiant heater 40, consisting of one or more electric heating elements 41, embedded in an insulating ceramic shell. A skirt tube 42, made from nickel or nickel alloy capable of resisting fused salt corrosion at elevated temperatures, passes through the crucible lid 43, through a ceramic collar 44, and connects the crucible 38, to a double ended cylinder 45, made from stainless steel. The ceramic collar 44, provides electrical isolation between the skirt tube 42, and the crucible lid 43. The skirt tube top end 46, is open and the skirt tube bottom end 47, is open as well. The skirt tube 42, rises midway into the double ended cylinder 45, which is located directly above the crucible lid 43. The skirt tube 42, drops nearly to the floor of the crucible 38, without contacting the bottom. A single cathode 48, electrode rod constructed from iron (Fe), nickel (Ni) or the nickel alloy C-276, enters from the top end of the double ended cylinder 45, drops through the open skirt tube top end 46, and does not extend beyond the open skirt tube bottom end 47, into the crucible 38, containing the molten salt(s). The cathode 48, electrode rod is electrically isolated from the rest of the electrolytic cell using a ceramic fitting 49, that prevents direct contact with the metallic parts of the cell. Multiple, concentrically arranged anode 50, electrode rods pass through the crucible lid 43, forming a circle around the skirt tube 42, of the electrolytic cell. The anode 50, electrode rods can be displaced linearly along the radial direction of the circular crucible lid 43, to vary the spacing between the anode 50, electrode rods and cathode 48, electrode rod. An increase in the distance between the anode 50, electrode rods and cathode 48, electrode rod results in an increase in the electrical resistance of the electrolytic cell while a decrease in distance yields a reduction in the electrical resistance of the cell. The anode 50, electrode rods are electrically isolated from other metal parts of the electrolytic cell using ceramic fittings 51. The method of operation of the electrolytic cell depends on the chemical contents of the crucible 38. If the hydrogen generation apparatus 10 shown in FIG. 1, was originally fueled with desalinated (fresh) water $(H_2O)$ and sodium (Na) metal reactants to generate hydrogen $(H_2)$ fuel 11, and sodium hydroxide (NaOH) byproduct, then the crucible 38, of the electrolytic cell will be filled with aqueous $NaOH_{(aq)}$ via the crucible inlet 52, and open valve 1 53. If the hydrogen generation apparatus 10 shown in FIG. 1, was originally fueled with salinated (sea) water $(H_2O)$ and sodium (Na) metal reactants to generate hydrogen $(H_2)$ fuel 11, then the crucible 38, of the electrolytic cell will be filled with a mixture of $NaOH_{(aq)}$ and sea salt, the latter consisting primarily of sodium chloride (NaCl). If the seawater reactant was concentrated up to 252.18 grams of sea salt solute per kilogram of seawater solution, then the crucible 38, will be filled via the crucible inlet 52, and open valve 1 53, with an aqueous mixture having an anhydrous content of 13.19% by weight sea salt and 86.81% by weight NaOH. Alternatively, the crucible 38, can be filled with aqueous $Na_2CO_{3(aq)}$ via the crucible inlet 52, and open valve 1 53. The radiant electric heater 40, melts and raises the temperature of the crucible fused salt charge 39, to range between 1223.15 K (950° C.) to 1323.15 K (1050° C.). Steam $(H_2O_{(g)})$ released from the aqueous mixture of $NaOH_{(aq)}$ and $NaCl_{(aq)}$ can be vented out from the cell via the crucible outlet 54, and open valve 2 55. The steam is also vented via the double ended cylinder outlet 56, and open valve 3 57. After venting steam $(H_2O_{(g)})$, argon (Ar) can be introduced via the double ended cylinder inlet 58, and open valve 4 59, to purge the interior of the double ended cylinder 45, removing air and oxygen $(O_2)$ that can react with sodium (Na) vapor via the double ended cylinder outlet 56, and open valve 3 57. After purging the interior of the double ended cylinder 45, electrolysis can begin after closing the crucible inlet valve 1 53, and the double ended cylinder inlet valve 4 59, while leaving crucible outlet valve 2 55, and double ended cylinder outlet valve 3 57, open. If electrolysis is performed on pure fused $NaOH_{(l)}$ then the electrolytic cell voltage can be set to $V_{CELL}$=1.78 V to produce sodium (Na) metal in a vapor state at the cathode 48, and steam $(H_2O_{(g)})$ and oxygen $(O_{2(g)})$ at the anode 50. The sodium (Na) metal vapor rises up through the riser tube 42, and expands into the double ended cylinder 45, whereupon it condenses to liquid $Na_{(l)}$ to be transferred from the double ended cylinder 45, via the double ended cylinder outlet 56, and open valve 3 57, for packaging and reuse in the hydrogen generation apparatus 10 units shown in FIG. 1. The steam ($H_2O_{(g)}$) and oxygen ($O_{2(g)}$) produced at the anode 50, exits the crucible 38, via the crucible outlet 54, and open valve 2 55. If electrolysis is performed on a mixture of fused $NaOH_{(l)}$ and $NaCl_{(l)}$ then the electrolytic cell voltage can be set to $V_{CELL}$=3.19 V if the entire contents of the crucible 38, must be electrolyzed simultaneously, to produce sodium (Na) metal in a vapor state at the cathode 48, and steam ($H_2O_{(g)}$), oxygen ($O_{2(g)}$) and chlorine ($Cl_{2(g)}$) at the anode 50. Alternatively, the entire contents of the crucible 38, can be electrolyzed using selective electrolysis, by initially setting the electrolytic cell voltage to $V_{CELL}$=1.78 V to electrolyze the fused $NaOH_{(l)}$, followed by an increase in voltage to $V_{CELL}$=3.19 V to electrolyze the remaining fused $NaCl_{(l)}$. If electrolysis of the fused $NaCl_{(l)}$ is not required, then it can be flushed out from the crucible 38, using seawater via the crucible outlet 54, and open valve 2 55, to produce concentrated brine solution for use as a reactant in the hydrogen generation apparatus 10 units shown in FIG. 1, operating in cold climates. If electrolysis is performed on pure fused $Na_2CO_{3(l)}$ then the electrolytic cell voltage can be set to $V_{CELL}$=3.68 V to produce sodium (Na) metal in a vapor state and carbon (C) at the cathode 48, and pure oxygen ($O_{2(g)}$) at the anode 50.

Figure 3:
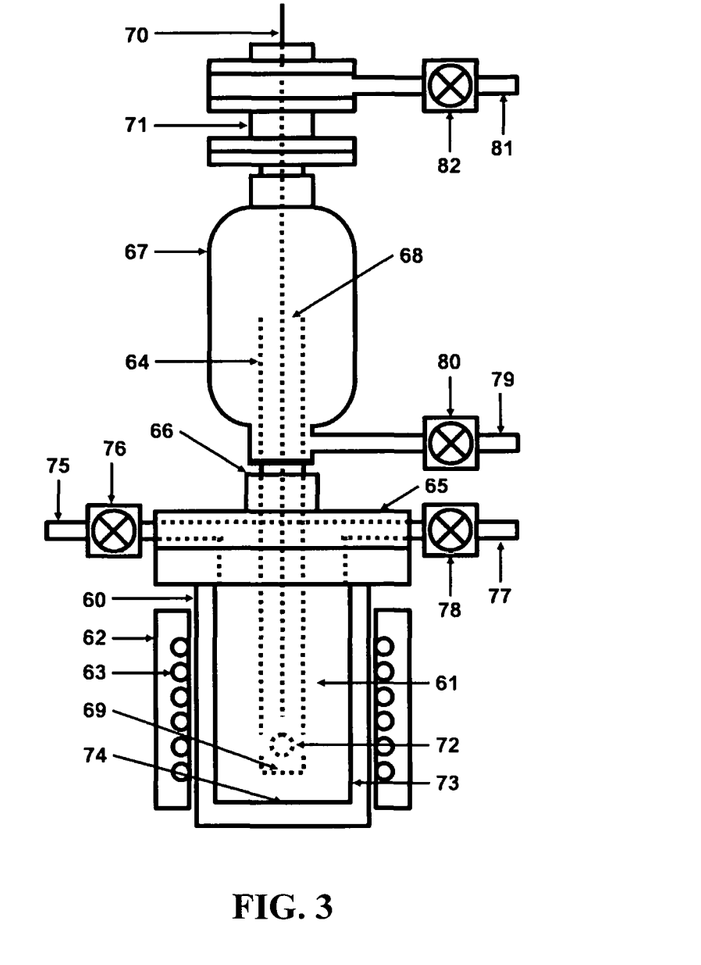
FIG. 3 illustrates the cost effective electrolytic cell configured to perform electrolysis using a very high current $I_{CELL}$=100,000 Amperes for implementation of the hydrogen fuel clean energy cycle on a large scale, by having the capability to perform electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal.

Referring to FIG. 3, a depiction of a variant of the cost effective electrolytic cell configured to perform electrolysis using a very high current $I_{CELL}$=100,000 Amperes at a temperature range between 1223.15 K (950° C.) to 1323.15 K (1050° C.) is shown consisting of a crucible 60, constructed from a refractory metal such as iron (Fe), nickel (Ni) or the nickel alloy C-276, resistant to molten salt corrosion at elevated temperatures. The crucible 60, holds a molten or fused salt charge 61, consisting of either pure sodium hydroxide (NaOH) or a mixture of sodium hydroxide (NaOH) and sea salt, the latter comprising primarily sodium chloride (NaCl). In addition, the crucible 60, can hold a charge 61, of pure sodium carbonate ($Na_2CO_3$). The crucible 60, is heated by a radiant heater 62, consisting of one or more electric heating elements 63, embedded in an insulating ceramic shell. A skirt tube 64, made from nickel or nickel alloy capable of resisting fused salt corrosion at elevated temperatures, passes through the crucible lid 65, through a ceramic collar 66, and connects the crucible 60, to a double ended cylinder 67, made from stainless steel. The ceramic collar 66, provides electrical isolation between the skirt tube 64, and the crucible lid 65. The skirt tube top end 68, is open and skirt tube bottom end 69, is sealed. The skirt tube 64, rises midway into the double ended cylinder 67, which is located directly above the crucible lid 65. The skirt tube 64, drops nearly to the floor of the crucible 60, without contacting the bottom. A single cathode 70, electrode rod constructed from iron (Fe), nickel (Ni) or the nickel alloy C-276, enters from the top end of the double ended cylinder 67, drops through the open skirt tube top end 68, and does not contact the sealed skirt tube bottom end 69. The cathode 70, electrode rod is electrically isolated from the rest of the electrolytic cell using a ceramic fitting 71, that prevents direct contact with the metallic parts of the cell. A set of holes 72, drilled into the skirt tube sidewalls allow the molten salt electrolyte charge 61, to flow freely around the cathode 70, electrode rod shielded within the skirt tube 64. Using a skirt tube 64, with a sealed skirt tube bottom end 69, allows the entire crucible 60, to become the anode electrode of the electrolytic cell and therefore, the products of electrolysis at the anode including steam ($H_2O$), oxygen ($O_2$) and chlorine ($Cl_2$) will be produced on the side wall surface 73, as well as at the floor surface 74, of the crucible 60, without risk for the anode products migrating to the cathode 70, electrode rod and reacting with Na metal to reduce the efficiency of the electrolytic cell. When it is necessary to use a large crucible 60, having a volume capable of holding a fused salt charge 61, with mass greater than 500 kg, it is possible to utilize multiple cathode electrode assemblies comprising a skirt tube 64, with a sealed skirt tube bottom end 69, double ended cylinder 67, and cathode 70, electrode rod to enable a large current $I_{CELL}$=100,000 Amperes to flow in the electrolytic cell to recover large quantities of Na metal at a high rate. The electrolysis cell shown in FIG. 3 and configured to perform electrolysis using a large current $I_{CELL}$=100,000 Amperes at a temperature range between 1223.15 K (950° C.) to 1323.15 K (1050° C.), operates similarly to the electrolytic cell illustrated in FIG. 2. If the hydrogen generation apparatus 10 shown in FIG. 1, was originally fueled with desalinated (fresh) water ($H_2O$) and sodium (Na) metal reactants to generate hydrogen ($H_2$) fuel 11, and sodium hydroxide (NaOH) byproduct, then the crucible 60, of the electrolytic cell will be filled with aqueous $NaOH_{(aq)}$ via the crucible inlet 75, and open valve 1 76. If the hydrogen generation apparatus 10 shown in FIG. 1, was originally fueled with salinated (sea) water ($H_2O$) and sodium (Na) metal reactants to generate hydrogen ($N_2$) fuel 11, then the crucible 60, of the electrolytic cell will be filled with a mixture of $NaOH_{(aq)}$ and sea salt, the latter consisting primarily of sodium chloride (NaCl). If the seawater reactant was concentrated up to 252.18 grams of sea salt solute per kilogram of seawater solution, then the crucible 60, will be filled via the crucible inlet 75, and open valve 1 76, with an aqueous mixture having an anhydrous content of 13.19% by weight sea salt and 86.81% by weight NaOH. Alternatively, the crucible 60, can be filled with aqueous $Na_2CO_{3(aq)}$ via the crucible inlet 75, and open valve 1 76. The radiant electric heater 62, melts and raises the temperature of the crucible fused salt charge 61, to range between 1223.15 K (950° C.) to 1323.15 K (1050° C.). Steam ($H_2O_{(g)}$) released from the aqueous mixture of $NaOH_{(aq)}$ and $NaCl_{(aq)}$ can be vented out from the cell via the crucible outlet 77, and open valve 2 78. The steam is also vented via the double ended cylinder outlet 79, and open valve 3 80. After venting steam ($H_2O_{(g)}$), argon (Ar) can be introduced via the double ended cylinder inlet 81, and open valve 4 82, to purge the interior of the double ended cylinder 67, removing air and oxygen ($O_2$) that can react with sodium (Na) vapor via the double ended cylinder outlet 79, and open valve 3 80. After purging the interior of the double ended cylinder 67, electrolysis can begin after closing the crucible inlet valve 1 76, and the double ended cylinder inlet valve 4 82, while leaving crucible outlet valve 2 78, and double ended cylinder outlet valve 3 80, open. If electrolysis is performed on pure fused $NaOH_{(l)}$ then the electrolytic cell voltage can be set to $V_{CELL}$=1.78 V to produce sodium (Na) metal in a vapor state at the cathode 70, and steam ($H_2O_{(g)}$) and oxygen ($O_{2(g)}$) at the anode 73, 74. The sodium (Na) metal vapor rises up through the riser tube 64, and expands into the double ended cylinder 67, whereupon it condenses to liquid $Na_{(l)}$ to be transferred from the double ended cylinder 67, via the double ended cylinder outlet 79, and open valve 3 80, for packaging and reuse in the hydrogen generation apparatus 10 units shown in FIG. 1. The steam ($H_2O_{(g)}$) and oxygen ($O_{2(g)}$) produced at the anode 73, 74, exits the crucible 60, via the crucible outlet 77, and open valve 2 78. If electrolysis is performed on a mixture of fused $NaOH_{(l)}$ and $NaCl_{(l)}$ then the electrolytic cell voltage can be set to $V_{CELL}$=3.19 V if the entire contents of the crucible 60, must be electrolyzed simultaneously, to produce sodium (Na) metal in a vapor state at the cathode 70, and steam ($H_2O_{(g)}$), oxygen ($O_{2(g)}$)

and chlorine ($Cl_{2(g)}$) at the anode 73, 74. Alternatively, the entire contents of the crucible 60, can be electrolyzed using selective electrolysis, by initially setting the electrolytic cell voltage to $V_{CELL}$=1.78 V to electrolyze the fused $NaOH_{(l)}$, followed by an increase in voltage to $V_{CELL}$=3.19 V to electrolyze the remaining fused $NaCl_{(l)}$. If electrolysis of the fused $NaCl_{(l)}$ is not required, then it can be flushed out from the crucible 60, using seawater via the crucible outlet 77, and open valve 2 78, to produce concentrated brine solution for use as a reactant in the hydrogen generation apparatus 10 units shown in FIG. 1, operating in cold climates. If electrolysis is performed on pure fused $Na_2CO_{3(l)}$ then the electrolytic cell voltage can be set to $V_{CELL}$=3.68 V to produce sodium (Na) metal in a vapor state and carbon (C) at the cathode 70, and pure oxygen ($O_{2(g)}$) at the anode 73, 74.

Figure 4:
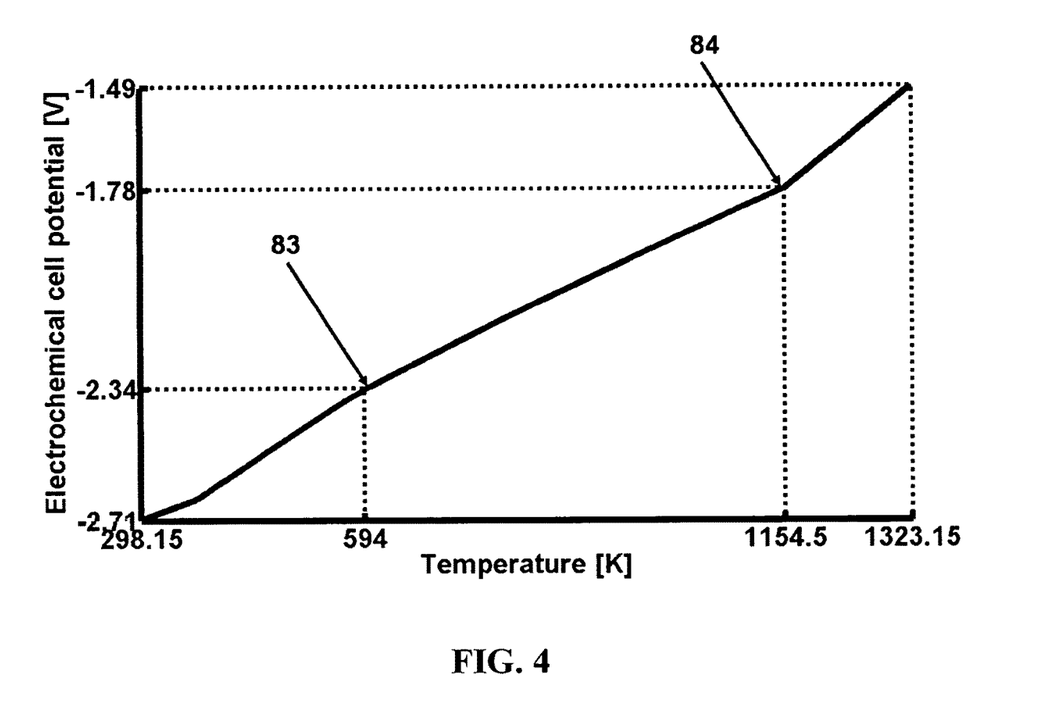
FIG. 4 illustrates the calculated electrochemical potential of the electrolytic cell as a function of temperature for sodium hydroxide (NaOH) according to Reaction 2.

Referring to FIG. 4, a depiction of the calculated electrochemical potential of the electrolytic cell as a function of temperature is shown for sodium hydroxide (NaOH) according to Reaction 2.

$4Na^+ + 4OH^- \rightarrow 4Na + 2H_2O + O_2$      Reaction 2:

Note that at the sodium hydroxide (NaOH) melting point or fusion temperature $T_f$=594 K, applying a potential $V_{CELL}$=2.34 V 83, will be sufficient to electrolyze $NaOH_{(l)}$. Raising the temperature of the fused $NaOH_{(l)}$ to the boiling point of sodium (Na) metal $T_b$=1154.5 K, reduces the potential required for electrolyzing the fused $NaOH_{(l)}$ to $V_{CELL}$=1.78 V 84.

Figure 5:
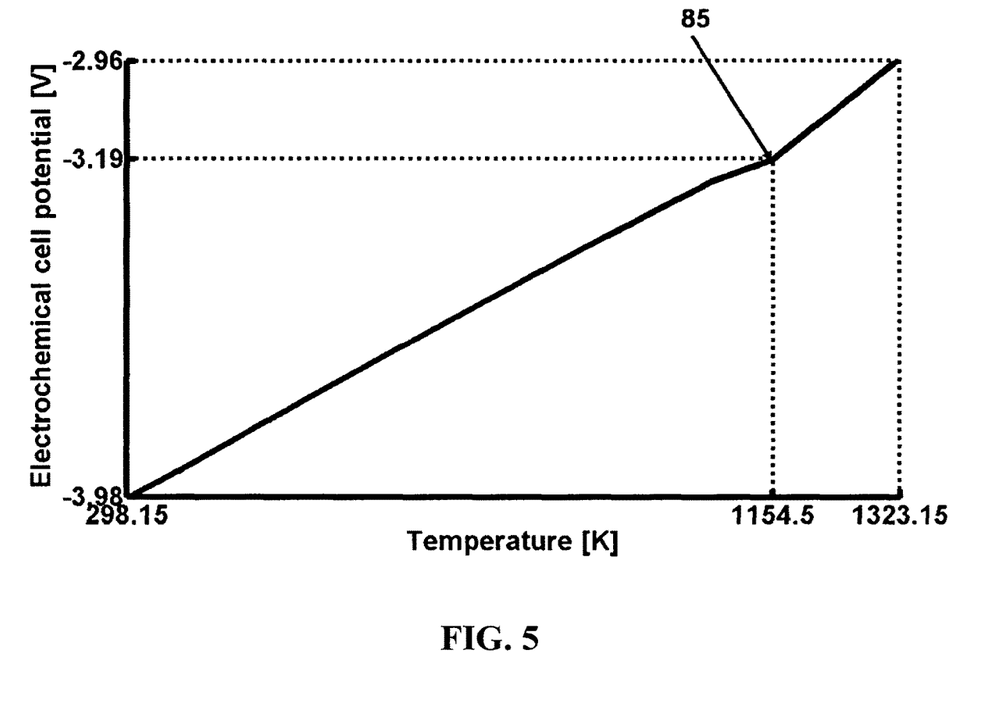
FIG. 5 illustrates the calculated electrochemical potential of the electrolytic cell as a function of temperature for sodium chloride (NaCl) according to Reaction 3.

Referring to FIG. 5, a depiction of the calculated electrochemical potential of the electrolytic cell as a function of temperature is shown for sodium chloride (NaCl) according to Reaction 3.

$2Na^+ + 2Cl^- \rightarrow 2Na + Cl_2$      Reaction 3:

Note that the sodium chloride (NaCl) melting point or fusion temperature $T_f$=1073.75 K. Applying a potential $V_{CELL}$=3.19 V 85, will be sufficient to electrolyze fused $NaCl_{(l)}$ at the boiling point temperature of sodium (Na) metal $T_b$=1154.5 K. From the calculations in FIG. 4 and FIG. 5, it becomes clear that selective electrolysis between the fused $NaOH_{(l)}$ and $NaCl_{(l)}$ is favored at high temperatures above the boiling point of sodium (Na) metal where the difference in the decomposition potentials between the fused $NaCl_{(l)}$ and $NaOH_{(l)}$ is given as $\Delta V_{CELL}$=3.19 V−1.78 V=1.41 V at the boiling point temperature of sodium (Na) metal $T_b$=1154.5 K.

Figure 6:
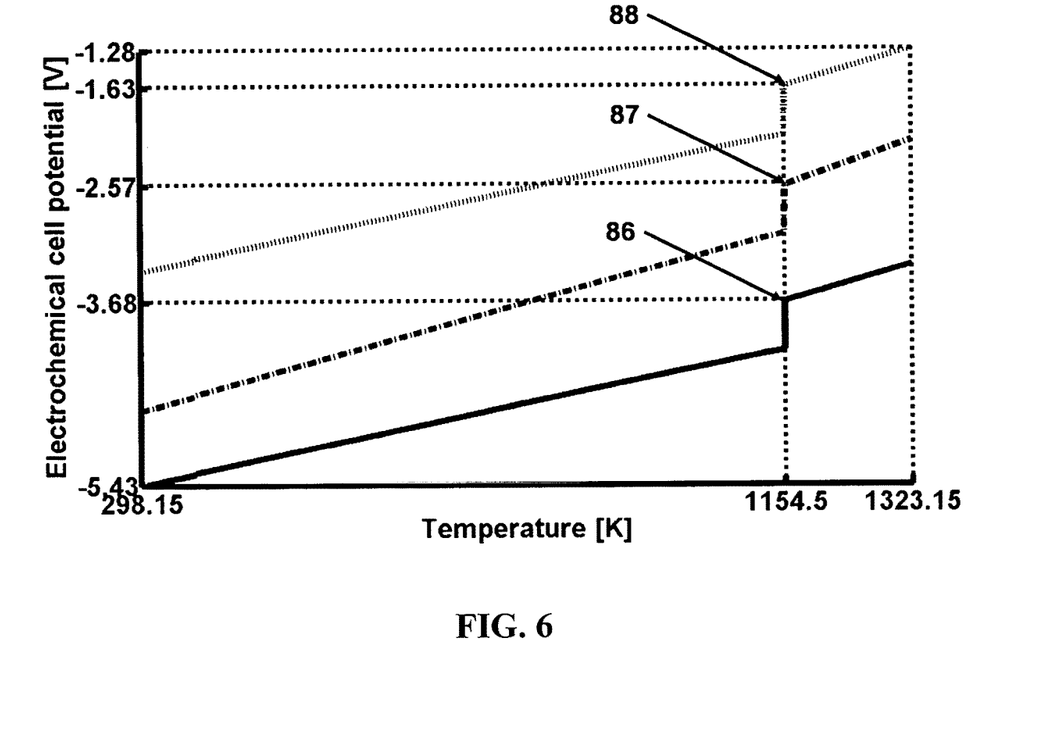
FIG. 6 illustrates the calculated electrochemical potentials of the electrolytic cell as a function of temperature for sodium carbonate ($Na_2CO_3$) according to Reactions 4, 5 and 6.

Referring to FIG. 6, a depiction of the calculated electrochemical potential of the electrolytic cell as a function of temperature is shown for sodium carbonate ($Na_2CO_3$) according to Reactions 4, 5 and 6.

$4Na^+ + 2CO_3^{-2} \rightarrow 4Na + 2C + 3O_2$      Reaction 4:

$4Na^+ + 2CO_3^{-2} \rightarrow 4Na + 2CO + 2O_2$      Reaction 5:

$4Na^+ + 2CO_3^{-2} \rightarrow 4Na + 2CO_2 + O_2$      Reaction 6:

Note that the sodium carbonate ($Na_2CO_3$) melting point or fusion temperature $T_f$=1124.15 K. Applying a potential $V_{CELL}$=3.68 V 86, will be sufficient to electrolyze fused $Na_2CO_{3(l)}$ at the boiling point temperature of sodium (Na) metal $T_b$=1154.5 K according to Reaction 4 that yields sodium (Na) metal, carbon (C) and oxygen ($O_2$) products while suppressing the undesirable Reactions 5 and 6. The Reaction 5 occurs at $V_{CELL}$=2.57 V 87, and Reaction 6 occurs at $V_{CELL}$=1.63 V 88, at the boiling point temperature of sodium (Na) metal $T_b$=1154.5 K with the undesirable evolution of carbon monoxide (CO) and/or carbon dioxide ($CO_2$), respectively at the anode.

In summary, the principal advantages of the hydrogen fuel, sustainable, closed clean energy cycle enabled by a cost effective electrolytic cell capable of performing electrolysis on three types of molten salts individually including NaOH, NaCl, $Na_2CO_3$ or on a mixture of NaOH and NaCl, including selective electrolysis between NaOH and NaCl at temperatures ranging between 1223.15 K (950° C.) to 1323.15 K (1050° C.), well above the boiling point temperature of sodium (Na) metal, include first and foremost the possibility to supplant carbon based fossil fuels for myriad applications in ground based energy generation. The hydrogen fuel, sustainable, closed clean energy cycle of the present invention will reduce carbon dioxide ($CO_2$) emissions and environmental pollution, leading to improved human health and economic development in the U.S.A. and worldwide. While the topic of climate change due to greenhouse gas emissions remains actively debated, it is readily evident that emissions from carbon based fossil fuel combustion have caused carbon dioxide ($CO_2$) levels in the earth's atmosphere to exceed 0.04% (400 ppm), as confirmed by measurements made in both the northern and southern hemispheres. The rising levels of carbon dioxide ($CO_2$) in the atmosphere, constitute a delayed yet real threat to the existence of the human species on earth, especially if vegetation can no longer sustain the rate necessary for recycling the $CO_2$ generated by human activity. The hydrogen fuel, sustainable, closed clean energy cycle of the present invention implemented on a large scale, will function to inhibit the adverse atmospheric effects that carbon based fossil fuel use has engendered. It might also prevent the human species from becoming extinct through self-asphyxiation.

The invention claimed is:

1. A method for implementing a hydrogen fuel, sustainable, closed clean energy cycle using solar powered electrolysis by means of an electrolytic cell capable of performing electrolysis on three types of molten salts individually including sodium hydroxide (NaOH), sodium chloride (NaCl), sodium carbonate ($Na_2CO_3$) or on a mixture of sodium hydroxide (NaOH) and sodium chloride (NaCl), including selective electrolysis between sodium hydroxide (NaOH) and sodium chloride (NaCl) at temperatures ranging between 1223.15 K (950° C.) to 1323.15 K (1050° C.), well above the boiling point temperature of sodium (Na) metal, comprising the steps of:

generating hydrogen ($H_2$) fuel on demand in a hydrogen generation apparatus using controlled chemical reactions between either ordinary salinated (sea) or desalinated (fresh) water ($H_2O$) and sodium (Na) metal or sodium hydride (NaH) reactants wherein said controlled chemical reactions produce hydrogen ($H_2$) fuel and chemical byproduct wherein said chemical byproduct comprises pure sodium hydroxide (NaOH) or sodium hydroxide (NaOH) mixed with sea salt and wherein said sea salt comprises sodium chloride (NaCl); and recovering said chemical byproduct from said hydrogen generation apparatus and transporting said chemical byproduct including said pure sodium hydroxide (NaOH) or said mixture of sodium hydroxide (NaOH) and sodium chloride (NaCl) to a self-contained solar powered electrolytic sodium (Na) metal production plant wherein said chemical byproduct is loaded into said electrolytic cell operating within said self-contained solar powered electrolytic sodium (Na) metal production plant; and electrolyzing said pure sodium hydroxide (NaOH) to recover said sodium (Na) metal; and deciding that if chlorine ($Cl_2$) production is needed electrolyzing said mixture of sodium hydroxide (NaOH) and sodium chloride (NaCl) simultaneously to produce said sodium (Na) metal at said electrolytic cell cathode and steam ($H_2O$), oxygen ($O_2$) and chlorine ($Cl_2$) at said electrolytic cell anode; and deciding that if chlorine ($Cl_2$) production is not needed electrolyzing said mixture of sodium hydroxide (NaOH) and sodium chloride (NaCl) selectively to electrolyze only said sodium hydroxide (NaOH) wherein said sodium (Na) metal is produced at said electrolytic cell cathode and steam ($H_2O$) and oxygen ($O_2$) are produced at said electrolytic cell anode and wherein said sodium chloride (NaCl) remains unelectrolyzed; and deciding that if said sodium (Na) metal is not needed from said sodium chloride (NaCl) remaining unelectrolyzed recovering and mixing with seawater said sodium chloride (NaCl) remaining unelectrolyzed to produce concentrated brine solution for use as reactant in said hydrogen generation apparatus; and deciding that if said sodium (Na) metal is needed from said sodium chloride (NaCl) remaining unelectrolyzed without chlorine ($Cl_2$) production transporting said sodium chloride (NaCl) remaining unelectrolyzed to a Solvay plant wherein said sodium chloride (NaCl) remaining unelectrolyzed and calcium carbonate ($CaCO_3$) undergo conversion to sodium carbonate ($Na_2CO_3$) product and calcium chloride ($CaCl_2$) byproduct; and electrolyzing said sodium carbonate ($Na_2CO_3$) product in said electrolytic cell to produce said sodium (Na) metal and carbon (C) at said electrolytic cell cathode and oxygen ($O_2$) at said electrolytic cell anode; and transporting said sodium (Na) metal produced at said electrolytic cell cathode to a solar or biohydrogen plant wherein said sodium (Na) metal reacts with hydrogen ($H_2$) to produce said sodium hydride (NaH) and wherein said sodium hydride (NaH) is used to generate said hydrogen ($H_2$) fuel on demand in said hydrogen generation apparatus.

2. A method according to claim 1 in which said electrolytic cell comprises a crucible holding said sodium hydroxide (NaOH) or said mixture of sodium hydroxide (NaOH) and sodium chloride (NaCl) or said sodium carbonate ($Na_2CO_3$) in a molten state wherein said electrolytic cell comprises a double ended cylinder above said crucible and wherein a skirt tube couples the interior space of said crucible with the interior space of said double ended cylinder above said crucible.

3. A method according to claim 2 in which said skirt tube rises midway into said double ended cylinder wherein said skirt tube drops into said crucible and wherein said skirt tube contacts said sodium hydroxide (NaOH) or said mixture of sodium hydroxide (NaOH) and sodium chloride (NaCl) or said sodium carbonate ($Na_2CO_3$) in a molten state.

4. A method according to claim 2 in which said skirt tube top end is open and said skirt tube bottom end is closed wherein a plurality of holes are drilled into the sidewalls of said skirt tube near said skirt tube bottom end and wherein said crucible comprises the anode electrode of said electrolytic cell.

5. A method according to claim 2 in which a cathode electrode rod enters from said double ended cylinder top end through said skirt tube top end into said interior space of said crucible without contacting said skirt tube wherein said cathode electrode rod contacts said sodium hydroxide (NaOH) or said mixture of sodium hydroxide (NaOH) and sodium chloride (NaCl) or said sodium carbonate ($Na_2CO_3$) in a molten state.

6. A method according to claim 2 in which said crucible comprises iron or nickel or nickel alloy C-276.

7. A method according to claim 2 in which said sodium hydroxide (NaOH) or said mixture of sodium hydroxide (NaOH) and sodium chloride (NaCl) or said sodium carbonate ($Na_2CO_3$) in a molten state contained in said electrolytic cell is electrolyzed at temperatures ranging between 1223.15 K (950° C.) to 1323.15 K (1050° C.) to produce sodium (Na) metal in a vapor state wherein said sodium (Na) metal in a vapor state rises through said skirt tube above said sodium hydroxide (NaOH) or said mixture of sodium hydroxide (NaOH) and sodium chloride (NaCl) or said sodium carbonate ($Na_2CO_3$) in a molten state and wherein said sodium (Na) metal in a vapor state expands and condenses inside said double ended cylinder to a liquid state.

8. A method according to claim 1 in which said electrolytic cell operating current is 100,000 Amperes.

9. A method according to claim 1 in which said sodium hydroxide (NaOH) contained in said electrolytic cell is electrolyzed at temperatures ranging between 1223.15 K (950° C.) to 1323.15 K (1050° C.) using an electrolytic cell voltage of 1.78 Volts.

10. A method according to claim 1 in which said mixture of sodium hydroxide (NaOH) and sodium chloride (NaCl) contained in said electrolytic cell is electrolyzed simultaneously at temperatures ranging between 1223.15 K (950° C.) to 1323.15 K (1050° C.) using an electrolytic cell voltage of 3.19 Volts.

11. A method according to claim 1 in which said mixture of sodium hydroxide (NaOH) and sodium chloride (NaCl) contained in said electrolytic cell is electrolyzed selectively at temperatures ranging between 1223.15 K (950° C.) to 1323.15 K (1050° C.) using an electrolytic cell voltage of 1.78 Volts wherein said electrolytic cell voltage of 1.78 Volts electrolyzes said sodium hydroxide (NaOH) and wherein said electrolytic cell voltage is increased to 3.19 V to electrolyze said sodium chloride (NaCl) remaining unelectrolyzed.

12. A method according to claim 1 in which said sodium carbonate ($Na_2CO_3$) contained in said electrolytic cell is electrolyzed at temperatures ranging between 1223.15 K (950° C.) to 1323.15 K (1050° C.) using an electrolytic cell voltage of 3.68 Volts.

* * * * *